Patented Sept. 5, 1922.

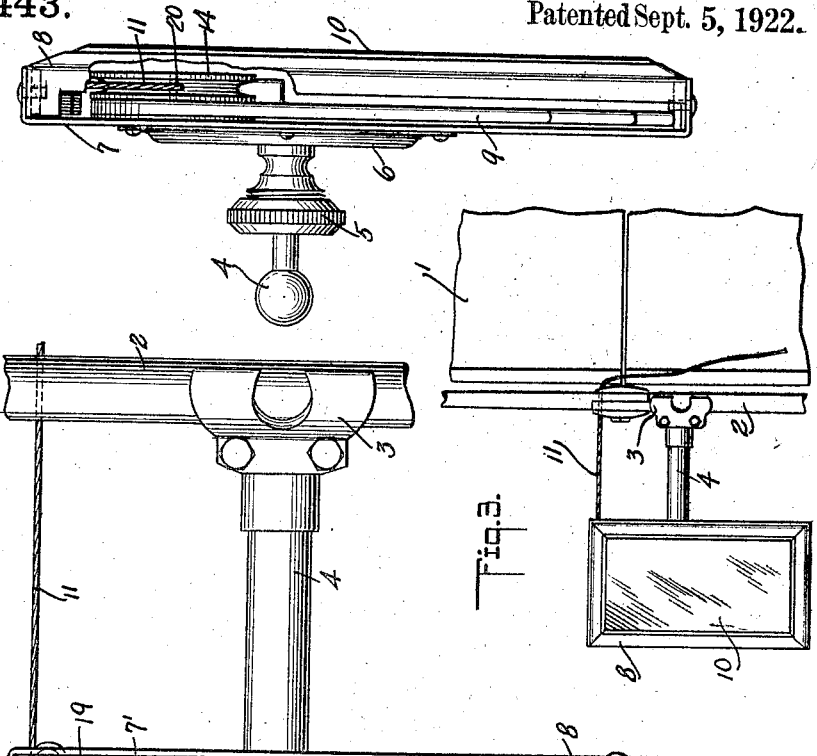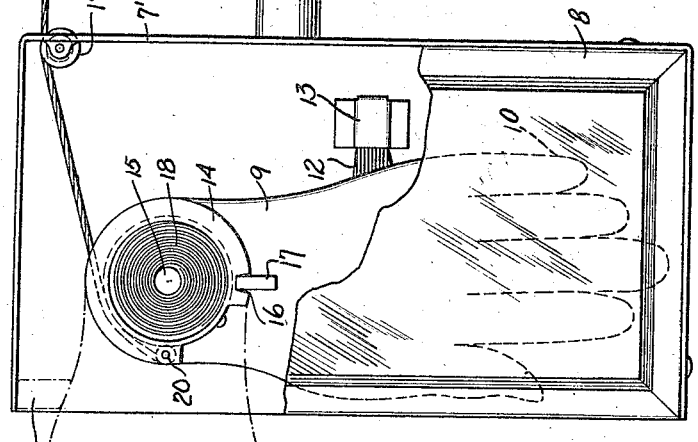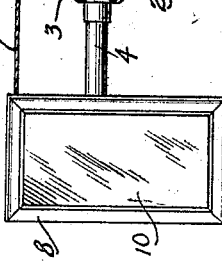

1,428,443

UNITED STATES PATENT OFFICE.

JACOB MANDEL, OF NEW YORK, N. Y.

TRAFFIC MIRROR.

Application filed December 13, 1921. Serial No. 522,178.

*To all whom it may concern:*

Be it known that I, JACOB MANDEL, a citizen of the United States, and a resident of the city of New York, borough of Manhattan, in the county and State of New York, have invented a new and Improved Traffic Mirror, of which the following is a full, clear, and exact description.

This invention relates to attachments for automobiles and particularly to an improved mirror therefor of a special construction which will act in the ordinary capacity of mirror and which may be operated to act as a signal member.

An object in view is to provide a traffic mirror with manually operated associated parts which normally are out of view but which may be quickly moved to view for giving a signal.

Another object of the invention is to provide a mirror with a housing and a spring retained signal hand together with a manually operated cord for swinging the signal member or hand against the action of the spring.

An additional object of the invention is to provide a signalling device operable either from an open or closed car, the device being associated with an ordinary traffic member so as not to add additional parts.

In the accompanying drawing—

Figure 1 is a front view of a mirror with its support shown attached, certain parts being broken away for illustrating the signal mechanism.

Figure 2 is an edge view of the structure shown in Figure 1, certain parts being broken away.

Figure 3 is a front view of the device ready for use.

Referring to the accompanying drawing by numerals, 1 indicates the windshield of an automobile of any kind provided with a suitable supporting rod 2 to which the clamp 3 is secured by suitable bolts or other clamping means. A bracket or supporting bar 4 extends from clamp 3 and is connected by a suitable clamping member 5 to the plate 6 which plate is screwed or riveted to the back plate 7, which back plate carries a front plate 8 connected thereto in any desired manner. There is a space between the front and back plates for connecting the signal hand 9 and other parts. The front plate carries a mirror 10 of any preferred or usual structure which mirror will act in the usual manner of traffic mirrors as indicated in Figure 3. Anyone looking at the complete device as shown in Figure 3 will see nothing but a mirror structure and a small cord 11 extending therefrom to a suitable position near the driver. When the cord is pulled, the signal hand 9 is moved outwardly as shown in dotted lines in Figure 1 for giving the desired signal. This signal hand may be of the shape shown or some other shape and when arranged between the plates 7 and 8 as shown in Figure 1, rests against a rubber bumper 12 supported by a suitable bracket 13. The signal hand 9 has a pulley wheel 14 rigidly secured thereto, which wheel is rotatably mounted on a shaft 15 carried by the rear plate 7 to which it is rigidly secured.

The pulley 14 may be secured to the hand 9 in any desired manner, as for instance, by having a notch 16 in which a lug 17 extending from the hand 9 extends. By this construction and arrangement, whenever the pulley wheel 14 is rotated, the hand will also be rotated. A spring 18 is arranged in the pulley wheel 14 with one end connected to the shaft 15 and the other to the pulley wheel, said spring being normally somewhat wound so as to continually normally press the signal hand 9 against the rubber bumper 12. A cord or tape 11 extends through the flange 7' and the plate 7 and over a guiding sheave 19 and partially around the pulley wheel 14 whereby it may be secured at 20 to the pulley wheel by a pin or other securing means. When the cord 11 is pulled, the pulley wheel 14 will be rotated against the action of spring 18 and the hand 9 will be quickly moved upwardly to the dotted position shown in Figure 1. A rubber bumper 21 is carried by the flange of the front plate 8 so that the hand may strike against the same as it swings outwardly. In view of these bumpers the outward and inward movement is accomplished quietly and in view of the bumper 12 and the continuous tension on spring 18, the signal hand 9 is normally maintained within the casing or housing formed by plates 7 and 8 and held against rattling.

It will be noted that the device is so constructed that it will not ordinarily be noticed except as an ordinary traffic mirror. Whenever desired, as for instance, when the weather is good, the cord or string 11 could be pulled to a position within the casing formed by the plates 7 and 8 and the device used only as a mirror. When the weather changes and appears as if rain is about to fall, the cord could be taken out and arranged as shown in Figures 1 and 2 and the device used in the double capacity of a traffic mirror and a signal even though the car should be closed.

What I claim is:—

A traffic mirror comprising, a reflecting surface, a signal arm arranged in back of the reflecting surface, a shaft for pivotally supporting said signal arm, a casing for supporting said shaft, said casing together with said reflecting surface substantially enclosing said arm normally, a pulley loosely mounted on said shaft and provided with a notch, and means extending from said arm into said notch for locking the arm and pulley together, a spring connected with said shaft and said pulley for resiliently holding the pulley in a given position and for returning the same to that position when moved therefrom, and a flexible member connected with said pulley extending from said casing, said flexible member being adapted to be pulled for rotating the pulley and thereby swinging the arm to a position outside of said casing for giving a signal.

JACOB MANDEL.